June 10, 1930.　　　S. J. V. BOVEY　　　1,762,465
COMBINED MUFFLER AND HEATER FOR VEHICLES
Filed Jan. 25, 1926
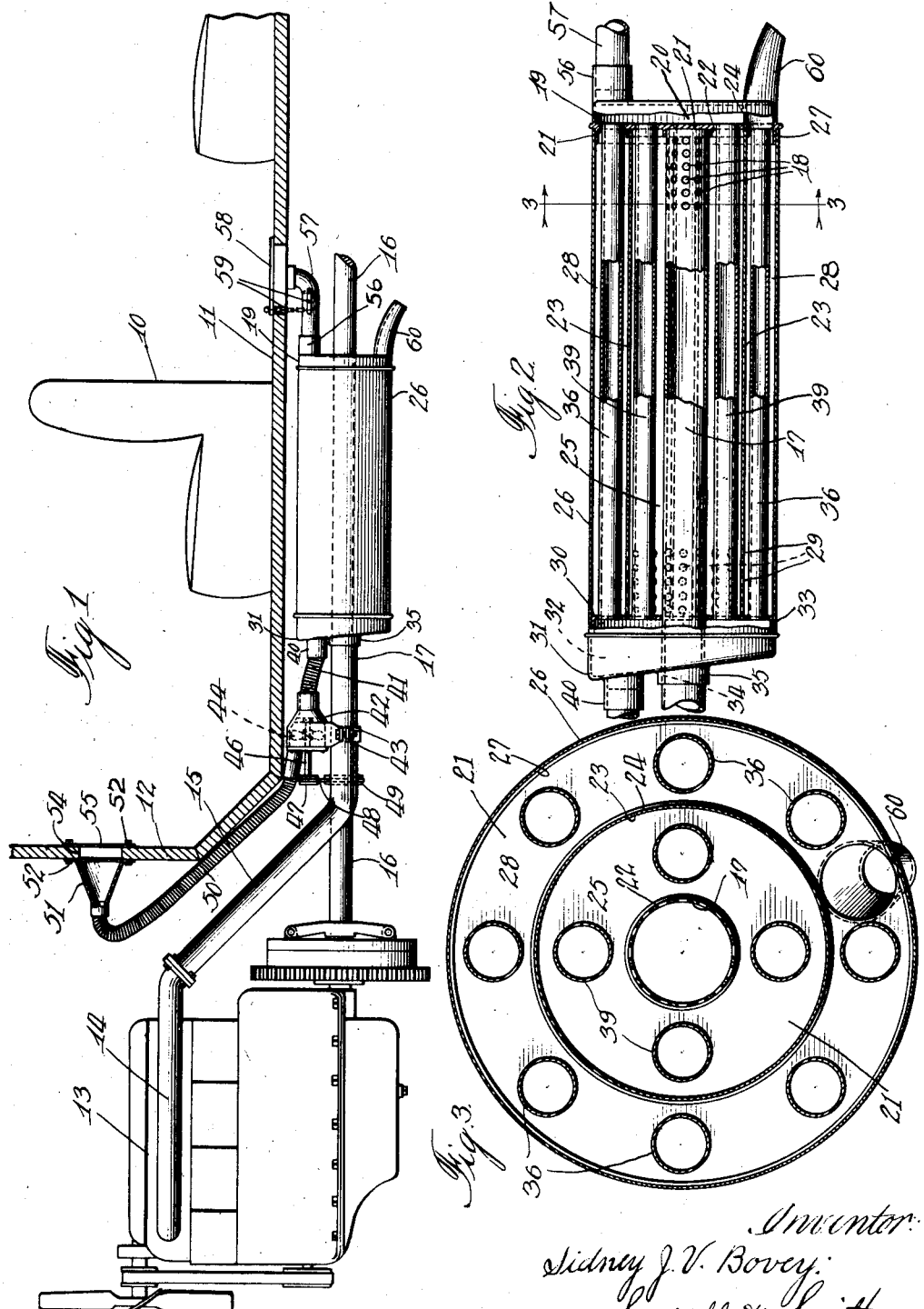

Patented June 10, 1930

1,762,465

UNITED STATES PATENT OFFICE

SIDNEY J. V. BOVEY, OF CHICAGO, ILLINOIS, ASSIGNOR, BY MESNE ASSIGNMENTS, TO METALCRAFT HEATER CORPORATION, OF GRAND RAPIDS, MICHIGAN, A CORPORATION OF MICHIGAN

COMBINED MUFFLER AND HEATER FOR VEHICLES

Application filed January 25, 1926. Serial No. 83,507.

This invention relates to a combined muffler and heater for vehicles.

The principal object of the invention is to provide a combined muffler and heater which is particularly adapted for use with enclosed vehicles or automobiles provided with internal combustion engines.

A further object of the invention is to provide an improved form of combination muffler and heater which is simple in construction and efficient in operation.

A still further object of the invention is to provide a combination muffler and heater in which the exhaust gases are circulated within the main casing and around fresh air conduits leading into the body of the car.

A still further object of the invention is to provide a construction of combination muffler and heater in combination with an internal combustion engine in which the exhaust gases are passed longitudinally back and forth through communicating means within the muffler and heater casing to efficiently muffle the noises as well as to efficiently heat the air passing through the casing.

A still further object of the invention is to provide a novel means in combination with my combined muffler and heater for withdrawing the air from within the enclosed body of the vehicle and passing it through the heater, thence back into the car so that there is a continuous circulation from within the body of the vehicle to the heater and thence back into the body of the car.

These and other objects are accomplished by providing a construction and an arrangement of the various parts in the manner hereinafter described and particularly pointed out in the appended claims.

Referring to the drawings,

Fig. 1 is a fragmentary view partly in cross section of a conventional form of enclosed vehicle or automobile together with an internal combustion engine showing my improved combination muffler and heater mounted therein.

Fig. 2 is an enlarged side elevational view partly in cross section showing the details of my combination muffler and heater.

Fig. 3 is an enlarged cross sectional view taken on the lines 3—3 in Fig. 2.

One of the important features of my present invention is directed to the novel construction and arrangement of a combination muffler and heater for vehicles in which the exhaust gases from the internal combustion engine of the vehicle are caused to be passed longitudinally to and from within the main casing which serves to muffle the noises of the discharging gases and also serves to heat the air being passed through the muffler for furnishing the heating means for the vehicle.

In the drawings I have illustrated one form of my invention and have shown the same in connection with the conventional form of vehicle or automobile 10 which comprises the main floor board 11 and the dash board 12. The automobile is provided with the usual chassis frame not shown and conventional form of internal combustion engine 13. The internal combustion engine 13 is provided with the usual exhaust gas conduit which includes the exhaust manifold 14 and exhaust gas pipe 15. The vehicle is provided with the usual main drive shaft 16 operatively connected to the crank shaft of the engine, not shown.

In adapting my combination muffler and heater, which I preferably mount on the horizontal portion 17 of the exhaust gas pipe 15, I preferably terminate the horizontal portion 17 of the exhaust gas pipe within the housing of my heater and muffler and provide its rear end with a plurality of apertures as shown at 18 about the periphery thereof so as to permit the exhaust gases to be discharged in a radial direction with respect to the longitudinal center of the exhaust gas pipe. Secured to the end of the horizontal portion 17 of the exhaust gas pipe 15 and closing the end thereof is an end housing member 19 which forms a heated air receiving and discharging chamber 20 in a substantially circular form. The end housing member 19 is provided with a vertically extending wall 21 which has formed integrally therewith an annularly formed laterally projecting rib 22 which is adapted to receive in telescopic relation and secure therein the rear end of the exhaust gas pipe so as to close this end of the exhaust gas pipe off from the air chamber 20 of the end housing member 19. Mounted concentrically with respect to and of a relatively larger diameter than the exhaust gas pipe 17 is an inner casing member 23. The inner casing member 23 has its rear end secured to a second annularly extending and projecting flange 24 which is formed integrally with the end housing member 19 so as to enclose the chamber 25 formed between the exhaust gas pipe 17 and the housing 23 at the rear end of the casing. Mounted concentrically with and of relatively larger diameter than the inner casing 23 is an outer or main casing 26 which has its rear end adapted to telescopically receive an annularly extending and laterally projecting flange 27 formed on the forward side of the end housing member 19. This outer casing forms another exhaust gas chamber 28 between the inner casing 23 and outer casing 26. The inner casing 23 is provided adjacent its forward end with a plurality of apertures 29 which are adapted to permit the exhaust gases to be discharged in a radial direction with respect to the longitudinal axis of the casing, or, in other words, to permit the gas to be discharged from the exhaust gas chamber 25 to the exhaust gas chamber 28. The forward end of the casing is provided with a partition disc or plate 30 which has a central annular bore for receiving the exhaust gas pipe 17 but closes the forward end of the chambers 25 and 28 and forms a partition wall for the forward end casing member 31. The forward end casing member 31 is provided with a fresh air receiving chamber 32. The end casing member 31 is mounted in telescopic relation in the forward end of the outer casing 26 as shown at 33. Each of the end housing members 19 and 31 are supported by having a portion of each of them extending into the main casing 26. It is quite obvious that the construction may be simplified by having the main casing 26 extended so as to form the housings 19 and 31 by providing the necessary partition walls. The end casing member 31 is provided with a longitudinally extending bore 34. Surrounding the bore 34 is an annular projecting flange 35 which is adapted to embrace the exhaust gas pipe 17 for securing the forward end of the combined muffler and heater in position on the exhaust gas pipe. In order to form communications between the fresh air receiving chamber 32 and the heated air receiving and discharging chamber 20 I have provided a plurality of tubes or conduits 36 which extend through the exhaust gas chamber 28 and tubes or conduits 39 which extend through the exhaust gas chamber 25. These tubes are secured to the partition plate 30 at the forward end and to the partition plate or wall 21 at the rear end so that the fresh air received in the fresh air chamber 31 may pass through these tubes to the heated air receiving and discharging chamber 20 of the end casing member 19. The end casing member 31 is provided with a forwardly projecting connection or nipple 40 which in turn is connected with a conduit 41. The forward end of the conduit 41 is connected to a fan casing 42 which in turn is secured to the exhaust gas conduit by means of clamping members and retaining bolts 43. Mounted within the fan casing 42 is a rotating fan 44 which is mounted on a shaft 46. The forward end of the shaft is provided with a pulley 47. The fan is operatively driven by a belt 48 which is trained about the pulley 47 secured to the shaft 46 and a pulley 49 mounted on the main drive shaft 16 of the vehicle. Connected with the forward end of the fan casing 42 is a conduit 50 which has its upper and forward end connected to a funnel-shaped member 51. The funnel-shaped member 51 is secured by means of bolts 52 to the vehicle dash board so as to receive or withdraw the air through the aperture 54 in the dash board 12. Covering the aperture 54 is a screen or perforated plate 55.

The end housing member 19 is provided adjacent its rear and upper end with a discharge spout 56 which is in communication with the heated air receiving and discharging chamber 20. The spout 56 telescopically receives a conduit 57 which in turn is in communication with a register 58 in the floor 11 of the body of the car. The conduit 57 is provided with the usual valve and control mechanism 59. The end housing member 19 is provided adjacent its rear and lower end with an exhaust gas discharge spout 60 which communicates with the exhaust gas chamber 28 formed between the inner casing 23 and the outer casing 26. From the above it will be seen that as the air is drawn from within the car through the conduit 50 by means of the fan 44 it is passed into the air receiving chamber 32 from where it is passed through the communicating means or tubes 36 and 39 and discharged into the heated air receiving and discharging chamber 20 formed in the end casing member 19, from where it is discharged through the conduits 56 and 57 in through the register into the body of the car. The exhaust gases during this time are conveyed to the rear end of the exhaust gas pipe 17 and are discharged through the peripheral holes 18 at the rear end thereof in radial directions into the exhaust gas chamber 25 where they are conveyed longitudinally forward in said chamber and discharged through the apertures 29 in the forward end of the inner casing 23 in a radial direction into the exhaust gas chamber 28. From here they are conveyed rearwardly in the exhaust gas chamber 28 and are discharged through the exhaust gas discharge spout 60.

The manner in which the exhaust gases are discharged through the exhaust gas pipe 18 and conveyed forwardly and discharged through the supplemental casing into the chamber 28 not only muffles the noises of the discharge gases but also heats the tubings 36 and 39 passing through these chambers 25 and 28 so that the air within these tubes is heated and conveyed through the chamber 20 into conduits 56 and 57 into the car and by reason of the fan 44 continuously circulating the air from within the body of the car through the heater thence back into the body of the car a very efficient and yet simple combination heater and muffler is provided.

While in the above specification I have described one embodiment which my invention may assume in practice, it will of course be understood that the same is capable of modification and that modification may be made without departing from the spirit and scope of the invention as expressed in the following claims.

What I claim as my invention and desire to secure by Letters Patent is:

1. A combined muffler and heater for vehicles comprising a casing, a fresh air receiving chamber located at one end of said casing, a heated air receiving and discharging chamber located at the other end of said casing, means for forming a communication between said chambers, and means for circulating the exhaust gases in tubular columns around said communicating means, said columns communicating with each other at the opposite ends whereby the air passing through said communicating means is heated.

2. A combined muffler and heater for vehicles comprising a casing, a fresh air receiving chamber located at one end of said casing, a heated air receiving and discharging chamber located at the other end of said casing, an exhaust gas pipe extending into said casing, an inner casing mounted concentrically with and between said exhaust gas pipe and said first named casing forming a chamber between the exhaust gas pipe and said second named casing and a chamber between said second named casing and said first named casing there being communication between each of said chambers and said exhaust pipe whereby the exhaust gases are discharged from said exhaust gas pipe into the chamber adjacent said exhaust gas pipe and from said last named chamber into said chamber adjacent said outside casing, and tubes extending through both of said chambers for connecting said fresh air chamber with said heated air receiving and discharging chamber.

3. A combination muffler and heater for vehicles comprising a casing, an exhaust gas pipe terminating within said casing, a longitudinally extending exhaust gas chamber within said casing, there being a plurality of apertures adjacent the end of said exhaust gas pipe forming communication with said gas chamber, a fresh air chamber within said casing, a heated air receiving and discharging chamber within said casing, and means extending through said longitudinally extending exhaust gas chamber and communicating said fresh air chamber with said heated air receiving and discharging chamber for heating the air passing through said communicating means.

4. A combination muffler and heater for vehicles comprising a casing, longitudinally extending exhaust gas chambers within said casing, a fresh air receiving chamber located at one end of said casing, a heated air receiving and discharging chamber located at the other end of said casing, and a plurality of tubes extending through said exhaust gas chambers and forming a communication between said fresh air chamber and said heated air receiving and discharging chamber whereby the air passing through said tubes is heated by the exhaust gases.

5. A combination muffler and heater for a vehicle comprising a casing, a plurality of concentrically arranged and longitudinally extending exhaust gas chambers formed in said casing, a fresh air receiving chamber located at one end of said casing, a heated air receiving and discharging chamber located at the other end of said casing, a plurality of tubes extending through said exhaust gas chambers and forming a communication between said fresh air chamber and said heated air receiving and discharging chamber whereby the air passing through said tubes is heated.

6. A combination muffler and heater for a vehicle comprising a casing, a plurality of concentrically arranged and longitudinally extending exhaust gas chambers formed in said casing, there being a plurality of perforations located at one end of the chamber wall forming a communication between each of said exhaust gas chambers, a fresh air receiving chamber located at one end of said casing, a heated air receiving and discharging chamber located at the other end of said casing, a plurality of tubes extending longitudinally through said exhaust gas chambers and forming a communication between said fresh air chamber and said heated air receiving and discharging chamber, whereby the exhaust gas is directed in concentric columns around said tubes for heating the air passing therethrough.

7. A combination muffler and heater for a vehicle comprising a casing, a plurality of longitudinally extending exhaust gas chambers formed in said casing and in communication with each other, a fresh air receiving chamber located at the forward end of said casing, a heated air receiving and discharging chamber located at the rear end of said casing, separate tubes extending from said fresh air chamber and extending to and communicating with said heated air receiving and discharging chamber, said tubes extending through the longitudinally extending exhaust gas chambers whereby the air passing through said tubes is heated by the exhaust gas in said exhaust gas chambers.

8. The combination with an exhaust gas conduit of an internal combustion engine, of a casing mounted on said exhaust gas conduit and having the rear end of said conduit terminating and discharging the exhaust gases within said casing, an inner casing mounted concentrically with respect to said gas exhaust conduit and forming two separate chambers between said first named casing and said gas exhaust conduit, means for forming a communication between said exhaust gas chambers, a fresh air receiving chamber located at the forward end of said casing, a heated air receiving and discharging chamber located at the rear end of said casing, a plurality of tubes extending through said exhaust gas chambers and forming a communication between said fresh air chamber and said heated air receiving and discharging chamber whereby the air passing through said tubes is heated by the exhaust gases within said exhaust gas chambers.

9. The combination with an exhaust gas conduit of an internal combustion engine, of a casing mounted on said gas exhaust conduit having one end of said gas exhaust conduit terminating within said casing whereby the exhaust gases are muffled within said casing, a plurality of longitudinally extending and concentrically arranged exhaust gas chambers formed in said casing and in communication with said exhaust gas conduits, and longitudinally extending conduits extending through said exhaust gas chambers whereby the air in said conduit is heated by the exhaust gas in said exhaust gas chambers.

In testimony whereof I have signed my name to this specification on this 18th day of January, A. D. 1926.

SIDNEY J. V. BOVEY.